(12) United States Patent
Ferstel et al.

(10) Patent No.: US 11,033,875 B2
(45) Date of Patent: Jun. 15, 2021

(54) PACKING ASSEMBLY, MATERIAL EXCHANGE COLUMN, AND METHOD

(71) Applicant: LINDE AKTIENGESELLSCHAFT, Munich (DE)

(72) Inventors: Johann Ferstel, Munich (DE); Anton Moll, Raisting (DE); Rainer Fluggen, Bichl (DE); Ludwig Bauer, Buxheim (DE); Manh-Hung Nguyen, Munich (DE); Rainer Hoffmann, Unterhaching (DE); Christian Matten, Pullach (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 55 days.

(21) Appl. No.: 16/083,736

(22) PCT Filed: Mar. 8, 2017

(86) PCT No.: PCT/EP2017/025040
§ 371 (c)(1),
(2) Date: Sep. 10, 2018

(87) PCT Pub. No.: WO2017/153054
PCT Pub. Date: Sep. 14, 2017

(65) Prior Publication Data
US 2019/0070580 A1 Mar. 7, 2019

(30) Foreign Application Priority Data

Mar. 10, 2016 (EP) ..................................... 16000578

(51) Int. Cl.
*B01J 19/32* (2006.01)
*B01D 3/32* (2006.01)
(Continued)

(52) U.S. Cl.
CPC ................ *B01J 19/32* (2013.01); *B01D 3/32* (2013.01); *B01D 3/42* (2013.01); *B01J 19/325* (2013.01);
(Continued)

(58) Field of Classification Search
CPC ...... B01D 3/32; B01D 3/42; B01J 2219/3221; B01J 2219/32213; B01J 2219/32217;
(Continued)

(56) References Cited

U.S. PATENT DOCUMENTS 4,472,325 A * 9/1984 Robbins ................. B01D 3/008
261/96
4,668,443 A * 5/1987 Rye ....................... F28F 25/087
261/112.2
(Continued)

FOREIGN PATENT DOCUMENTS

DE 19520802 A1 * 12/1996 ............... B01D 3/32
DE 10238489 A1 3/2004
(Continued)

OTHER PUBLICATIONS

DE19520802A1_ENG (Espacenet machine translation of Reichenspurner) (Year: 1996).*
(Continued)

*Primary Examiner* — Jonathan Miller
*Assistant Examiner* — Gabriel E Gitman
(74) *Attorney, Agent, or Firm* — Millen White Zelano & Branigan, PC; Brion P. Heaney

(57) ABSTRACT

The invention relates to a packing assembly for a material exchange column, comprising at least one structured packing plate and a container in which the at least one structured packing plate is arranged. The at least one structured packing plate has packing packets. Each packing packet has interconnected packing sheets. The packing sheets are cor- (Continued)

rugated and have corrugation peaks and corrugation valleys. Adjacent packing sheets contact each other at the corrugation peaks. Additional corrugated packing sheets are added between the packing packets such that the at least one packing plate is pretensioned against the container in a radial direction thereof. Both the corrugated packing sheets of the packing packets as well as the additional corrugated packing sheet added between the packing packets are arranged solely on a common preferred plane or parallel thereto.

17 Claims, 13 Drawing Sheets

(51) Int. Cl.
*F25J 3/04* (2006.01)
*B01D 3/42* (2006.01)

(52) U.S. Cl.
CPC .... *F25J 3/04909* (2013.01); *B01J 2219/3221* (2013.01); *B01J 2219/32213* (2013.01); *B01J 2219/32217* (2013.01); *B01J 2219/32244* (2013.01); *B01J 2219/32272* (2013.01); *B01J 2219/32275* (2013.01); *B01J 2219/32286* (2013.01); *B01J 2219/32408* (2013.01); *F25J 2290/42* (2013.01)

(58) Field of Classification Search
CPC .... B01J 2219/32244; B01J 2219/32272; B01J 2219/32275; B01J 2219/32286; B01J 2219/32408; F25J 3/04909; F25J 2290/42; B01F 3/04; F28C 1/00; F28C 2001/006; F28F 25/04
See application file for complete search history.

(56) References Cited

U.S. PATENT DOCUMENTS

| | | | |
|---|---|---|---|
| 5,456,865 A | | 10/1995 | Pluess et al. |
| 5,916,492 A | * | 6/1999 | Bischoff ............... B01J 19/325 261/112.2 |
| 6,891,061 B1 | * | 5/2005 | Nishimura ............. B01D 3/324 560/218 |
| 7,357,378 B2 | | 4/2008 | Zone et al. |
| 7,422,197 B2 | | 9/2008 | Zone et al. |
| 7,604,222 B2 | | 10/2009 | Zone et al. |
| 2004/0031584 A1 | * | 2/2004 | Zich ........................ B01J 19/32 165/4 |
| 2006/0082006 A1 | | 4/2006 | Zone et al. |
| 2008/0073199 A1 | | 3/2008 | Zone et al. |
| 2008/0088042 A1 | | 4/2008 | Zone et al. |

FOREIGN PATENT DOCUMENTS

| | | | | |
|---|---|---|---|---|
| EP | 0601257 A1 | | 6/1994 | |
| EP | 1647318 A2 | | 4/2006 | |
| GB | 525575 | * | 8/1940 | ............... B01D 3/32 |

OTHER PUBLICATIONS

International Search Report for PCT/EP2017/025040 dated Jun. 2, 2017.
English Abstract of DE10238489, Publication Date: Mar. 4, 2004.

* cited by examiner

PACKING ASSEMBLY, MATERIAL EXCHANGE COLUMN, AND METHOD

The invention relates to a packing assembly for a mass transfer column, to a mass transfer column with such a packing assembly and to a method for producing such a packing assembly.

With the aid of mass transfer columns, such as rectification or air separation columns, it is possible to break down liquefied air into its constituents. Such a mass transfer column has a cylindrical vessel, in which so-called packings are arranged. A distinction is made here between random and structured packings. Random packings are loose fills of bodies of a defined shape, such as rings, cylinders, saddles or the like. By contrast with this, in the case of structured packings, sheets provided with corrugated or serrated structures are usually arranged in such a way that channels and exchange surfaces for liquid and/or gas streams are formed, in order that there is a directing of the gas and/or liquid streams and intensive contact of the two. In the case of structured packings, generally a number of structured packing plates are stacked one on top of the other. The packing plates may be constructed from packing packets in the form of blocks.

Gas pressure surges or flooding of the vessel for example may cause displacements of the packing plates and/or of the packing packets, which may lead to the creation of gaps between the packing plates and individual packing packets of a packing plate.

DE 195 20 802 A1 describes a method for installing a layer of a structured packing in a mass transfer column. In the method, the packing layer is spread in the radial direction, in that individual lamellae of the material from which the packing is constructed, expanded metal or other perforated material is inserted between at least one pair of neighboring segments.

The object of the present invention is to provide a further improved packing assembly.

Accordingly, a packing assembly for a mass transfer column is proposed. The packing assembly comprises at least one structured packing plate and a vessel, in which the at least one structured packing plate is arranged, wherein the at least one structured packing plate has packing packets, wherein each packing packet comprises interconnected packing sheets, wherein the packing sheets are corrugated and have corrugation peaks and corrugation valleys, wherein neighboring packing sheets contact one another at the corrugation peaks, wherein additional corrugated, preferably loose, i.e. unconnected, packing sheets are inserted between the packing packets in such a way that the at least one packing plate is pretensioned in a radial direction of the vessel against the latter, and wherein both the corrugated packing sheets of the packing packets and the additional corrugated packing sheets inserted between the packing packets are arranged exclusively in or parallel to a common preferred plane.

The radial direction is preferably oriented from a central axis of the in particular tubular vessel to an inner wall of the same. Pretensioning may be understood as meaning that the packing plate applies a radially acting, continuous force to the vessel. The vessel, and consequently also the packing plate, preferably have a circular cross section. Running around the packing plate, a sealing collar may be provided for sealing the packing plate with respect to the vessel. Preferably, the pretensioned packing plate presses against the vessel circumferentially on the inside with a uniform force. The additional packing sheets may be structurally identical to the packing sheets from which the packing packets are constructed. In particular, the additional packing sheets may be removed or detached from existing packing packets. The additional packing sheets may also be referred to as loose packing sheets, since they are not fixedly connected to the packing packets.

The preferred plane is defined as any plane that is parallel to a plane in which the central axis of the vessel is arranged. The preferred plane may also be identical to this already mentioned plane comprising the central axis. That is to say that the preferred plane intersects the vessel parallel to the central axis thereof. The preferred plane is consequently any plane intersecting the vessel parallel to the central axis thereof. All packing sheets of a packing plate are oriented parallel to this preferred plane. The packing sheets, which are actually corrugated, may be regarded in simplified terms as planar sheets, which respectively form a plane. Alternatively, corrugation peaks or corrugation valleys of the corrugated packing sheets may respectively form a plane that is parallel to the preferred plane. The packing sheets of different packing plates may be turned in relation to one another, so that each packing plate may have a preferred plane of its own. That is to say that the preferred plane may also be referred to as the preferred plane of the at least one packing plate. The installation of the packing elements into the vessel may be performed both with horizontal arrangement and with vertical arrangement. The installation of the packing packets is preferably performed through manholes provided on the vessel. Preferably, the additional packing sheets are inserted between the packing packets with the aid of planar or smooth auxiliary sheets. The auxiliary sheets are subsequently removed again.

The packing sheets may be structured, for example perforated and/or corrugated, aluminum sheets. Preferably, the packing sheets are oriented vertically in the vessel, that is to say oriented in the direction of the central axis of the same. The corrugation valleys and corrugation peaks are preferably oriented obliquely in relation to the central axis, for example at an angle of 45°. The corrugation valleys and corrugation peaks form the aforementioned channels for gas and/or liquid.

Both the packing sheets of the packing packets and the additional packing sheets are corrugated. In this case, the packing sheets may have a primary structure, to be specific the aforementioned corrugation with the corrugation peaks and the corrugation valleys, and a secondary structure. The secondary structure may be an impression provided on the packing sheets, for example an impression with pyramidal geometry, or a perforation. The secondary structure is preferably smaller in terms of its dimensions than the primary structure.

It is consequently ensured by the pretensioning of the packing plate that no gaps form in the packing plate during the operation of the mass transfer column. As a result, a maldistribution of gas and/or liquid is prevented. This allows the efficiency of the mass transfer column to be improved. A maldistribution should be understood as meaning an uneven distribution. The fact that both the packing sheets of the packing packets and the additional packing sheets inserted between them are all oriented exclusively parallel to the preferred plane means that, in comparison with the method described above, known from DE 195 20 802 A1, it is prevented that subsequently inserted packing sheets are oriented perpendicularly to the preferred plane. As a result, a fluid flow along the preferred plane in the at least one packing plate is not hindered. This also prevents a maldistribution of gas and/or liquid.

According to one embodiment, the packing packets are joined to one another without any gaps.

The freedom from gaps is permanently ensured by the pretensioning. Preferably, neighboring packing packets and packing sheets contact one another at contact regions. The packing sheets are preferably corrugated, so that channels in which gas and/or liquid can flow are formed between neighboring packing sheets. A gap is defined in the present case as a region between packing packets or packing sheets in which the latter do not contact one another and in which no contact regions are provided. That is to say that, in or at the gap, the packing packets or packing sheets do not touch. Accordingly, it is also the case that none of the aforementioned channels for gas and/or liquid are formed in the gap. Such a gap may have a cuboidal geometry.

According to a further embodiment, the additional packing sheets are inserted between the packing packets in pairs.

It is also possible for a number of pairs of additional packing sheets, for example four additional packing sheets or six additional packing sheets, to be inserted. That is to say that the number of inserted additional packing sheets is in particular an even number. Like the packing sheets of the packing packets, the additional packing sheets are corrugated. The two additional packing sheets of a pair of additional packing sheets are in this case arranged in such a way that the corrugation peaks and the corrugation valleys of the packing sheets cross over and are arranged for example at an angle of 90° to one another. The two additional packing sheets of a pair of additional packing sheets then contact one another at the corrugation peaks.

According to a further embodiment, the additional packing sheets are removable from the packing packets.

The packing sheets of a packing packet are connected to one another with the aid of connecting means, such as for example wire pins, screws or steel strips. A number of packing sheets are stacked one on top of the other to form a packing packet. There may be any number of packing sheets per packing packet. For removing packing sheets, the packing packets are separable. Preferably, the additional packing sheets can be removed from the packing packets in pairs.

According to a further embodiment, a number of structured packing plates form a structured packing.

The packing may comprise any number of plates stacked one on top of the other. Preferably, the preferred planes of two packing plates arranged directly one on top of the other are positioned perpendicularly to one another. The preferred planes may however be arranged at any desired angle to one another. The packing assembly may comprise a number of packings arranged one on top of the other.

According to a further embodiment, the structured packing plates of the structured packing are subjected to a pressing force in a longitudinal direction of the vessel.

The formation of gaps between packing plates of a packing and between packings arranged one on top of the other is prevented by the pressing force. The pressing force is applied continuously.

According to another embodiment, the pressing force can be applied with the aid of a hold-down device placed onto the structured packing, a liquid distributor placed onto the structured packing and/or a weight placed onto the structured packing.

The hold-down device, the liquid distributor and/or the weight may be placed directly onto the uppermost packing plate of the packing. In particular, the liquid held in the liquid distributor can also additionally weigh down the packing.

According to a further embodiment, the hold-down device is fastened adjustably on a carrying device of the vessel.

The carrying device may have a multiplicity of butt straps, which are evenly distributed over a circumference of the vessel and are fixedly connected to the vessel. For example, the packing may be pretensioned by applying the pressing force and then the hold-down device may be set in such a way that the packing remains pretensioned even when the pressing force is taken away.

According to a further embodiment, slots in which fastening elements are displaceably held for adjusting the hold-down device are provided on the hold-down device.

The slots may also be provided on the butt straps. The fastening elements are preferably screws. As a result, the hold-down device can be set as desired.

According to a further embodiment, for applying the pressing force the hold-down device is spring-pretensioned in the direction of the structured packing with the aid of spring elements.

The spring elements are preferably compression springs. The spring elements may be provided between the hold-down device and a carrying device provided on the vessel. The use of the spring elements has the advantage that they cover only little cross-sectional area of the vessel, and therefore are not determinative for the dimensions of an inside diameter of the vessel.

A mass transfer column with such a packing assembly is also proposed.

The mass transfer column may comprise a multiplicity of such packing assemblies. The packing assembly may furthermore also be used in all applications where structured packings are used, for example in vessels for 2- or 3-phase separation, cooling towers or the like.

A method for producing a packing assembly is also proposed. The method comprises the following steps: providing a vessel; providing packing packets, wherein each packing packet comprises interconnected packing sheets; providing additional, preferably loose, i.e. unconnected, packing sheets, installing the packing packets into the vessel for forming at least one packing plate; and inserting the additional packing sheets between the packing packets in such a way that the at least one packing plate is pretensioned in a radial direction of the vessel against the latter, wherein both the packing sheets of the packing packets and the additional packing sheets inserted between the packing packets are arranged exclusively in or parallel to a common preferred plane, wherein, for closing gaps arranged perpendicularly to the preferred plane and between the packing packets, first the packing packets are displaced toward one another perpendicularly to the preferred plane and then they are displaced outwardly in the radial direction until the packing packets contact the vessel, in order to form a gap that is arranged parallel to the preferred plane, and wherein the gap that is arranged parallel to the preferred plane is closed by the additional packing sheets.

The installation of the packing packets into the vessel and the insertion of the additional packing sheets may be carried out at the same time. With the aid of the method, both gaps that are in the preferred plane and gaps that are oriented perpendicularly to the preferred plane can be avoided between the packing packets. When the packing packets are being installed into the vessel, the packing packets may also be subjected to the pressing force manually or hydraulically. The packing sheets are preferably inserted with the aid of unstructured, that is to say smooth, auxiliary sheets. For this purpose, the auxiliary sheets are pushed in between the packing packets and the packing sheets are pressed in between the packing packets along the auxiliary sheets. The method may also comprise a step of closing gaps oriented in the preferred plane and gaps oriented perpendicularly to the preferred plane. Packing sheets are thereby preferably inserted exclusively into the gaps that are oriented in or parallel to the preferred plane. The gaps that are oriented perpendicularly to the preferred plane are closed in particular by a displacement of the packing packets along the preferred plane.

In particular, as mentioned above, a gap that is oriented perpendicularly to the preferred plane may form when fitting the packing packets. To close such a gap, it is in particular not possible to insert packing sheets into it, since the packing sheets would then be oriented perpendicularly to the preferred plane and would form a barrier in the respective packing plate. Instead, the gap is preferably closed by the packing packets being pushed together in the direction of the preferred plane. The pushing together of the packing packets may have the effect that circumferential gaps form on the outside of the packing plate. In order to close these circumferential gaps, packing sheets lying on the outside in the radial direction may for example be removed from the packing packets previously displaced in the preferred plane. The packing packets from which the packing sheets are removed may then be displaced outwardly in the radial direction until the circumferential gaps are closed and the packing packets are in close contact with the vessel. Radially outward displacement of the packing packets may then have the effect that a gap running in the preferred plane forms. As explained above, this can subsequently be closed again with the aid of pushed-in packing sheets.

In the method, the packing packets are preferably provided together with the additional packing sheets. That is to say that, when producing or supplying the packing packets, preferably the additional packing sheets are also provided, in particular in pairs. The additional packing sheets may then be inserted in pairs between the packing packets or omitted.

According to one embodiment, a number of packing plates are pressed together by applying a pressing force.

The pressing force may be applied manually, hydraulically, with the aid of spring elements, by placing a hold-down device onto the structured packing, by placing a liquid distributor onto the structured packing and/or by placing a weight onto the structured packing.

According to a further embodiment, the additional packing sheets are inserted between the packing packets in pairs.

It is also possible for a number of pairs of additional packing sheets, for example four additional packing sheets or six additional packing sheets, to be inserted. That is to say that the number of inserted additional packing sheets is in particular an even number. Like the packing sheets of the packing packets, the additional packing sheets are corrugated. The two additional packing sheets of a pair of additional packing sheets are in this case arranged in such a way that the corrugation peaks and the corrugation valleys of the packing sheets cross over and are arranged for example at an angle of 90° to one another. The two additional packing sheets of a pair of additional packing sheets then contact one another at the corrugation peaks.

According to a further embodiment, the additional packing sheets are removed from the packing packets.

In particular, as described above, packing sheets left over during adaptation work on the packing packets can be reused to save resources. Preferably, the additional packing sheets are removed from the packing packets in pairs.

Further possible implementations of the packing assembly, of the mass transfer column and/or of the method also include combinations of features or embodiments described above or below with respect to the exemplary embodiments that have not been explicitly mentioned. A person skilled in the art will also add individual aspects as improvements or supplementations to the respective basic form of the packing assembly, of the mass transfer column and/or of the method.

BRIEF DESCRIPTION OF THE DRAWINGS

Further advantageous design embodiments and aspects of the packing assembly, of the mass transfer column and/or of the method are the subject matter of the dependent claims and of the exemplary embodiments of the packing assembly, of the mass transfer column and/or of the method described below. The packing assembly, the mass transfer column and/or the method will be explained in more detail hereunder on the basis of preferred embodiments with reference to the appended figures.

In the figures, elements that are the same or have the same function have been given the same reference signs, unless stated otherwise.

Figure 1:
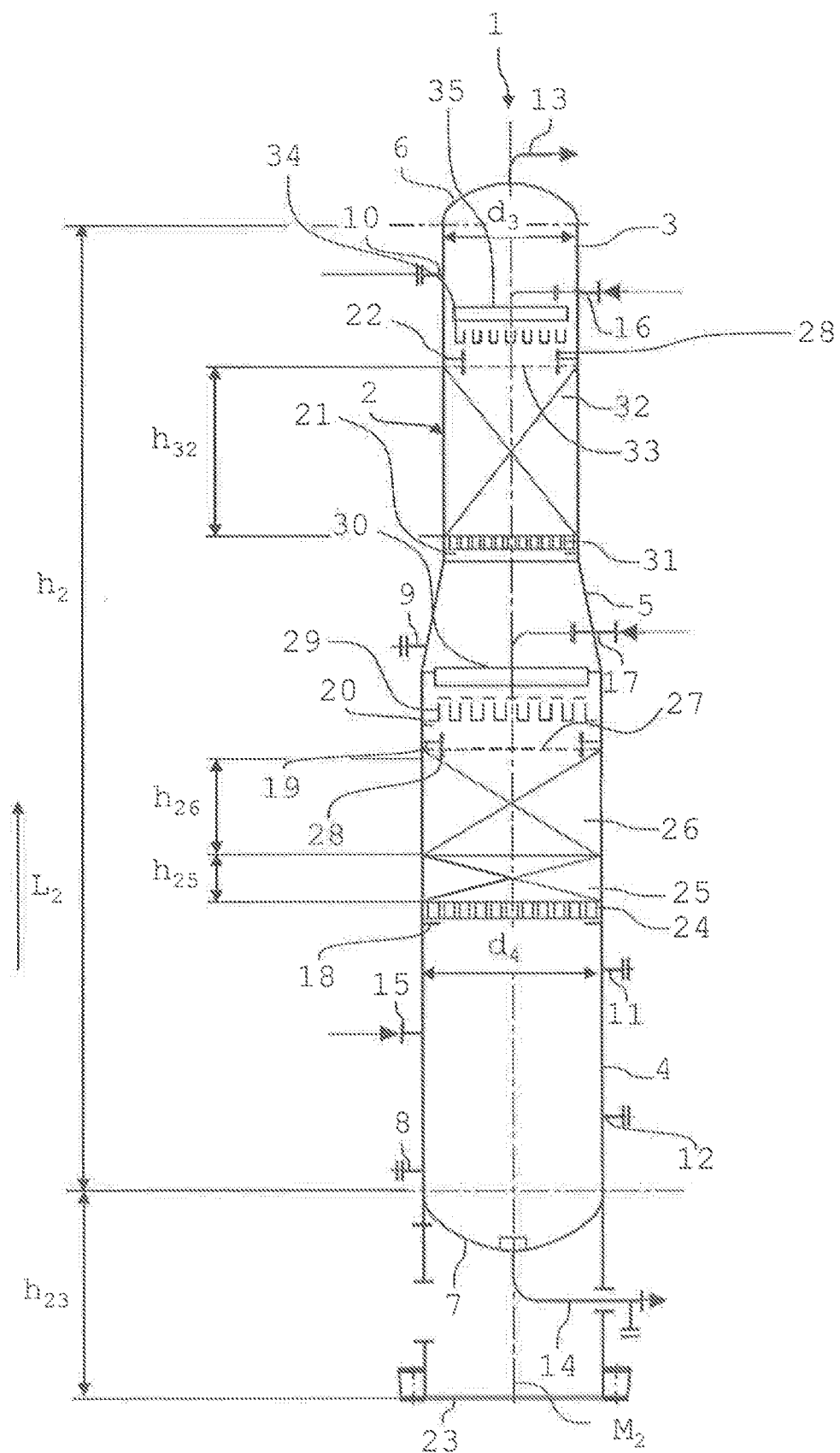
FIG. 1 shows a schematic sectional view of one embodiment of a mass transfer column.

FIG. 1 shows a schematic sectional view of one embodiment of a mass transfer column 1. The mass transfer column 1 may be a rectification or air separation column. Rectification should be understood as meaning a thermal separating process which represents an extension of distillation or an arrangement of many distillation steps in series. As compared with distillation, the advantages of rectification are that the plant can be operated continuously and that the separating effect is many times greater in comparison with distillation, since the vapor comes into contact with the liquid in counter current repeatedly in succession. The mass transfer column 1 consequently operates more efficiently in terms of energy, is technically less complex and more space-saving than an arrangement of single distillations one after the other.

The mass transfer column 1 comprises a vessel 2, which has a cylindrical geometry. The vessel 2 may for example be produced from an aluminum material or a steel material. The vessel 2 is preferably produced from an aluminum material. The vessel 2 is constructed cylindrically around an axis of symmetry or central axis M2. The vessel 2 may have a height h2. The height h2 may be for example 30,000 to 50,000 millimeters. The vessel 2 may comprise a first vessel portion 3 with an inside diameter d3 and a second vessel portion 4 with an inside diameter d4, wherein the inside diameter d3 is less than the inside diameter d4. For example, the inside diameter d3 may be 7400 millimeters and the inside diameter d4 may be 9400 millimeters. The first vessel portion 3 and the second vessel portion 4 may have in each case a circular cross section.

Provided between the first vessel portion 3 and the second vessel portion 4 is a frustoconical third vessel portion 5, which connects the first vessel portion 3 to the second vessel portion 4. The first vessel portion 3 is closed at the end with the aid of a cover 6 and the second vessel portion 4 is closed at the end with the aid of a base 7. Any number of manholes 8 to 12 may be provided on the vessel 2 for maintenance purposes and for fitting internals into the vessel 2. The manholes 8 to 12 may have in each case a diameter of for example 24 inches (600 millimeters) or 40 inches (1000 millimeters).

Furthermore, the vessel 2 has a gas outlet 13, provided at the cover 6, and a liquid outlet 14, provided at the base 7. During the operation of the mass transfer column 1, low-boiling fractions are discharged via the gas outlet 13, and high-boiling fractions are discharged via the liquid outlet 14. Also provided on the vessel 2 are a gas inlet 15 and two liquid inlets 16, 17. Mounted in the vessel 2 are carrying devices 18 to 22, on which internals are mounted and on which internals can be supported. The carrying devices 18 to 22 are fixedly connected to the vessel 2, for example welded. There can be any number of carrying devices 18 to 22. The carrying devices 18, 20, 21 may be carrying rings running around the inside of the vessel 2. The carrying devices 19, 22 may be butt straps attached to the inside of the vessel 2, which may be arranged evenly over a circumference of the vessel 2. The vessel 2 may be positioned on a foundation 23. A height $h_{23}$ from a lower edge of the foundation 23 to the second vessel portion 4 may be 11,600 millimeters.

Placed on a first carrying device 18 is a first carrying or supporting grid 24. Positioned on the supporting grid 24 is a first structured packing 25. The first packing 25 may have a height $h_{25}$ of for example 1350 millimeters. Positioned on the first packing 25 is a second structured packing 26 with a height $h_{26}$ of for example 6050 millimeters. There may be any number of the packings 25, 26, of any respective height $h_{25}$, $h_{26}$. A disk-shaped first hold-down device 27 is provided above the second packing 26, and in particular resting on the second packing 26. The first hold-down device 27 may be a grid and is liquid-permeable. The first hold-down device 27 may be connected to a second carrying device 19. Fastening elements 28, for example screws, may be provided for this purpose. On the first hold-down device 27 and/or on the second carrying device 19, slots in which the fastening elements 28 engage may be provided, so that the first hold-down device 27 is adjustable in height along a longitudinal direction $L_2$ of the vessel 2, that is to say along the central axis $M_2$.

Provided above the second carrying device 19 in the longitudinal direction $L_2$ is a third carrying device 20, on which a first liquid distributor 29 is placed. The first liquid distributor 29 may also be placed directly on the second packing 26. Attached above the first liquid distributor 29 is a first pre-distributor 30, to which liquid can be fed via the liquid inlet 17. Placed on a fourth carrying device 21 is a second carrying or supporting grid 31, which carries a third structured packing 32. The third packing 32 may have a height $h_{32}$ of 6050 millimeters.

Provided on the third packing 32 is a disk-shaped second hold-down device 33. The second hold-down device 33 may be connected to a fifth carrying device 22. Again, fastening elements 28 may be provided for this purpose. On the second hold-down device 33 and/or on the fifth carrying device 22, slots in which the fastening elements 28 engage may be provided, so that the second hold-down device 33 is adjustable in height along the longitudinal direction $L_2$ of the vessel 2. Provided above the third packing 32 is a second liquid distributor 34. The second liquid distributor 34 may be placed directly on the third packing 32. Attached over the second liquid distributor 34 is a second pre-distributor 35, to which liquid can be fed via the liquid inlet 16.

Figure 2:
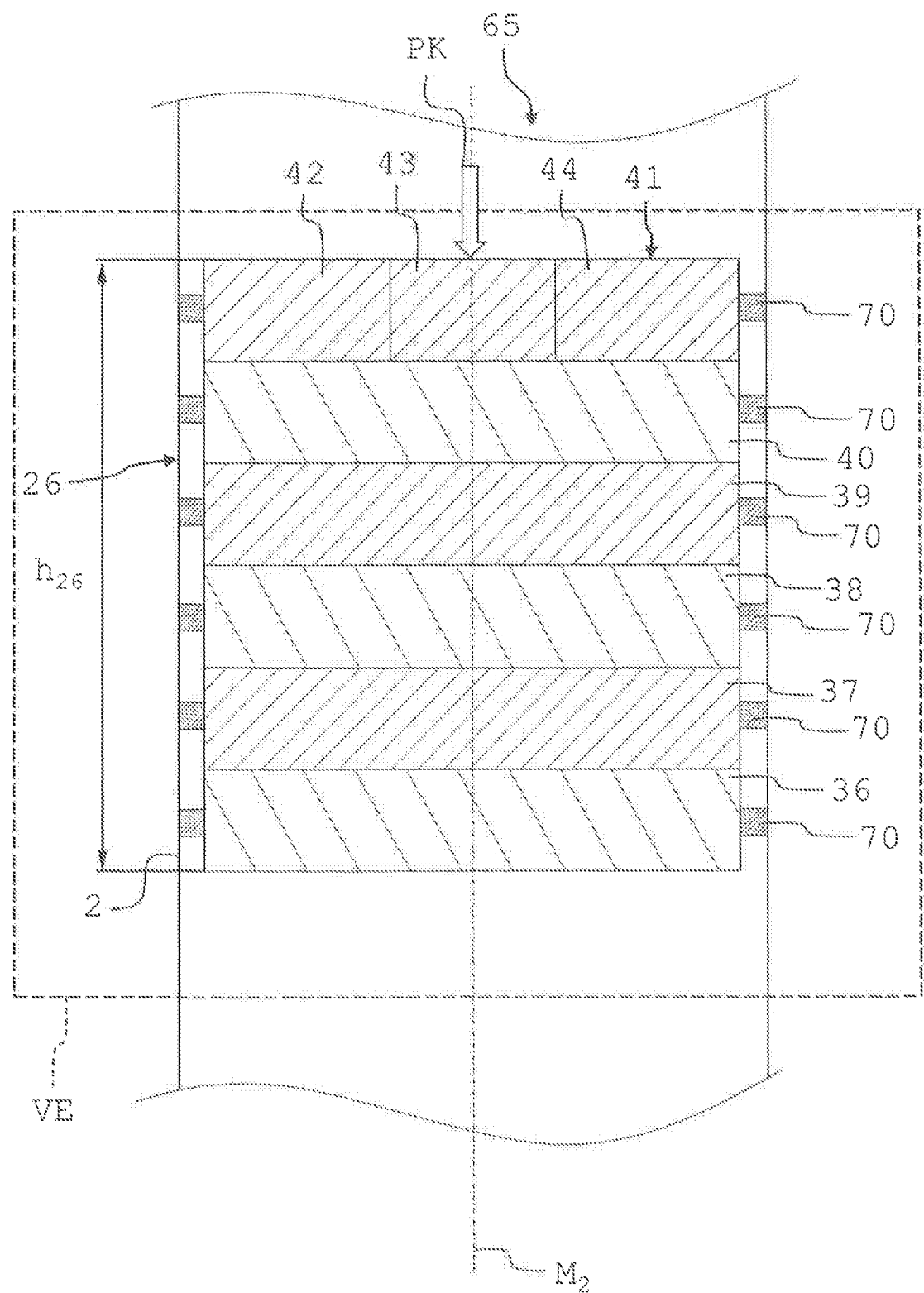
FIG. 2 shows a schematic sectional view of one embodiment of a packing assembly for the mass transfer column according to FIG. 1.
Figure 3:
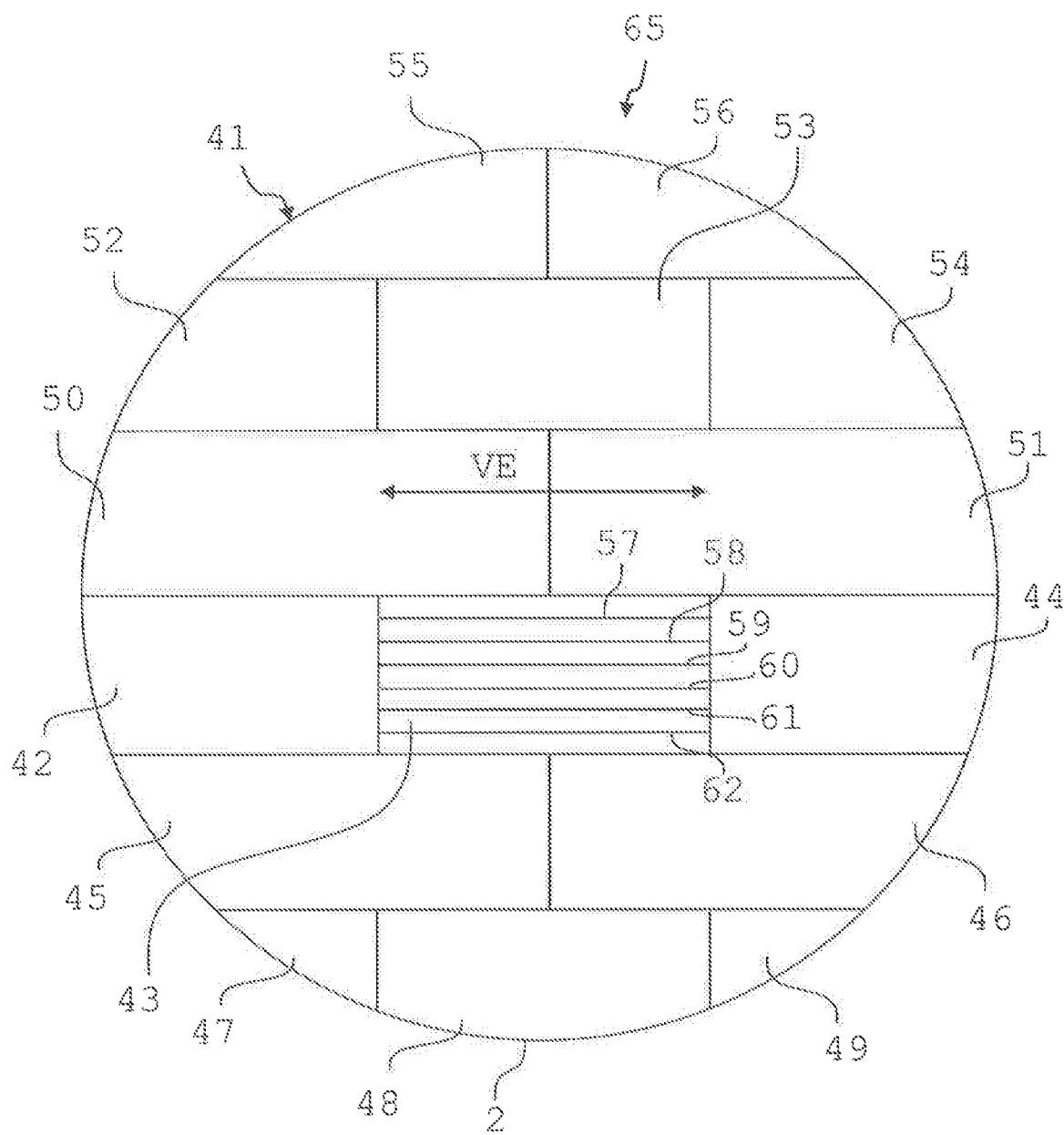
FIG. 3 shows a schematic view of the packing assembly according to FIG. 2.

FIG. 2 shows a schematic sectional view of the second packing 26. FIG. 3 shows a view of the second packing 26. The packings 25, 32 may have an identical construction to the second packing 26. In the case of structured packings 25, 26, 32, metal meshes or sheets are folded and/or wound in such a way that there is intensive directing of the vapor and the liquid, and an associated intensive contact of the two. By further structuring of the surface and by making holes, both the wettability of the packing surface and the mass transfer are increased further. The packings 25, 26, 32 are structured packings. Only the second packing 26 is referred to below.

The second packing 26 may have a multiplicity of structured packing layers or packing plates 36 to 41, which are arranged one on top of the other. Such packing plates 36 to 41 consist of thin, corrugated and/or perforated metal plates, or wire meshes. The design of the packing plates 36 to 41 ensures an optimum exchange between the various phases (liquid/gaseous or liquid/liquid) with minimal pressure resistance. There can be any number of packing plates 36 to 41. The packing plates 36 to 41 may be produced from perpendicularly arranged packing sheets, in particular corrugated aluminum sheets. Because of their structure, the packing plates 36 to 41 form condensation surfaces, on which for example during air separation constituents of air can condense. For example, the packing sheets used may have a thickness of 0.1 millimeter.

Each packing plate 36 to 41 is segmented into a multiplicity of packing elements or packing packets 42 to 56. In the orientation of FIG. 2, only the uppermost packing plate 41 is shown segmented. There can be any number of packing packets 42 to 56 per packing plate 36 to 41. The packing plates 36 to 41 have in each case a thickness of 200 to 250 millimeters. The packing plates 36 to 41 are placed on one another without any joins and the packing packets 42 to 56 are placed against one another without any joins. As mentioned above, each packing packet 42 to 56 is constructed as shown in FIG. 3 on the basis of the packing packet 43 from a multiplicity of packing sheets 57 to 62 arranged in parallel. The packing sheets 57 to 62 are aligned parallel to a preferred plane VE. All of the packing sheets 57 to 62 of all the packing packets 42 to 56 of a packing plate 36 to 41 are aligned in the preferred plane VE. Also, all of the packing sheets 57 to 62 of all the packing plates 36 to 41 of a packing 25, 26, 32 may be aligned in the preferred plane VE. Furthermore, the preferred planes VE of two neighboring packing plates 36 to 41 may also be arranged perpendicularly to one another.

The packing plates 36 to 41 are placed on one another without any joins and the packing packets 42 to 56 are placed against one another without any joins. In order also to ensure the freedom from joins of the packings 25, 26, 32 during the operation of the mass transfer column 1, the hold-down devices 27, 33 are configured in such a way that they press onto the packings 25, 26, 32 continuously, and thus formation of a gap is prevented or existing gaps are closed. The force necessary for this may be applied by means of various systems. This involves applying a required pressing force PK to the packings 25, 26, 32 and introducing it into the vessel 2 via the carrying devices 18, 21. Here, the pressing force PK is applied dynamically. That is to say that the magnitude of the pressing force PK acting downwardly in the direction of the foundation 23 remains approximately constant during the operation of the mass transfer column 1, even if the uppermost packing plate 41 moves upward or downward by a certain amount, for example several millimeters to centimeters in the longitudinal direction $L_2$.

This dynamic application of the pressing force PK consequently differs from the known static system, in which a fixedly installed hold-down device only applies a force to the packing at one specific point. A hold-down device that is only statically fixed above the uppermost packing plate only performs its function under certain conditions. That is to say, small tolerances when the hold-down device is attached may have the effect of creating room for movement of the packing plates. Static application of the force can therefore have the consequence that an upper edge of the packing does not lie against the hold-down device. Because of the gap, there is no contact between the upper edge and the hold-down device. Therefore, the packing is also not pressed in the downward direction. If the packing moves upward, contact takes place and the packing is only secured locally by the hold-down device. The fact that a dynamic pressing force PK is not exerted in the case of known assemblies means that a displacement of the packing plates and of the packing packets cannot be completely prevented, for example when there is flooding of the mass transfer column or there are gas pressure surges.

Displacements may lead to the creation of gaps between the packing plates and the individual packing packets of a packing plate, whereby the following effects may occur. When the liquid film runs off from one packing plate to the next packing plate lying thereunder, turned 90°, a drip nose forms on the underside of each packing sheet, which reduces the flow cross section for the gas. The width of the drip nose depends on how far away the next contact point is with respect the packing sheet lying thereunder. That is to say that the size of the gap has a direct influence on the gas capacity. A gap between two packing plates consequently disturbs the flow-off of the liquid from the upper packing plate to the lower packing plate, since the liquid must collect into a drip at the lower edge of the packing plate, and only flows further after the necessary dripping-off weight has been reached. The formation of a drip has the effect of reducing the free cross-sectional area for the gas flow, as a result of which the gas velocity and the pressure loss increase. As from a certain gas velocity, the liquid is entrained and premature flooding occurs at the packing plates.

If there are horizontal gaps between the packing plates, liquid can then be displaced along a packing sheet lower edge, as a result of which a maldistribution of gas and liquid can be produced. Furthermore, the maldistribution of gas may be encouraged by gaps between the packing packets forming a bypass in which an excessive amount of gas can flow in the upward direction. The maldistribution of liquid may be encouraged by liquid collecting along gaps and then flowing further in the downward direction at one location. That is to say that the even distribution of the liquid over the cross section of the packing is impaired. Premature flooding and consequently a reduction in the capacity of the mass transfer column may be encouraged. Maldistribution of gas and/or liquid may cause a loss of effectiveness.

Figure 4:
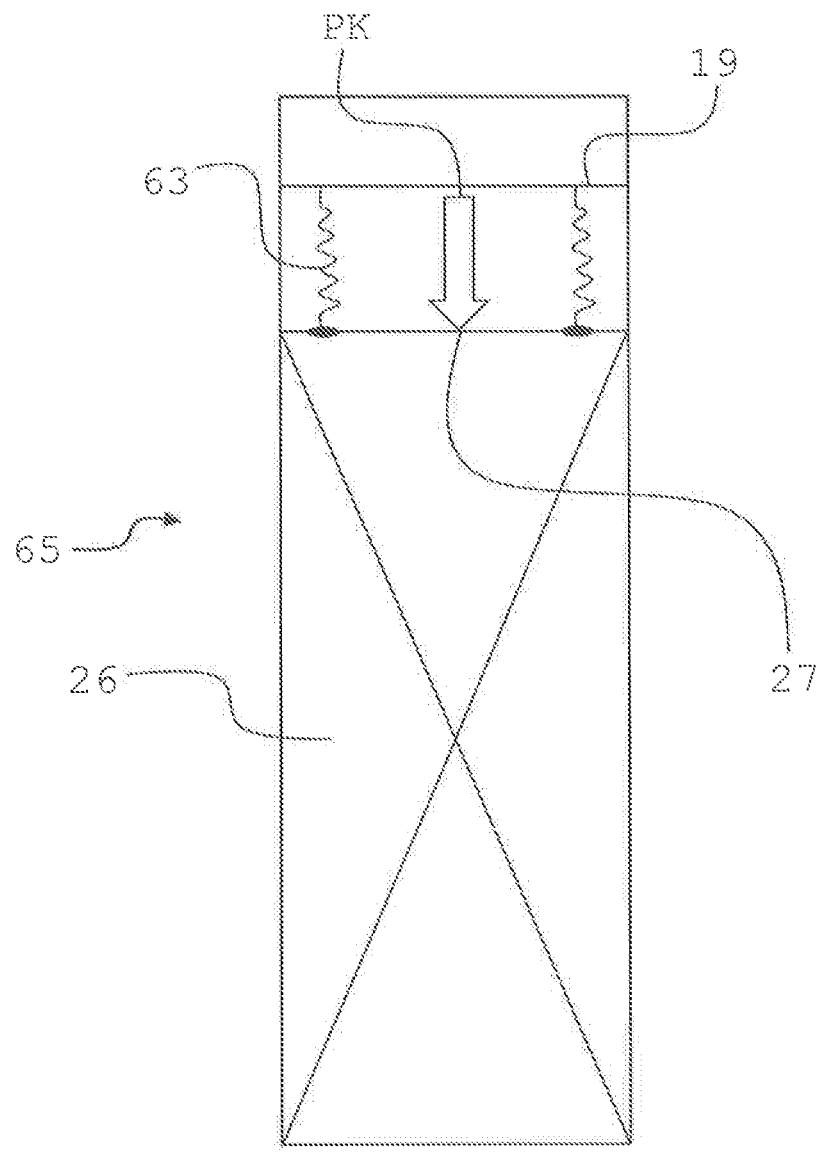
FIG. 4 shows a schematic sectional view of a further embodiment of a packing assembly for the mass transfer column according to FIG. 1.

To avoid the aforementioned disadvantages, as mentioned above, the pressing force PK is applied dynamically in the case of the mass transfer column 1 according to FIG. 1. As shown in FIG. 4, the dynamic application of the pressing force PK may take place with the aid of spring elements 63. Preferably, a multiplicity of spring elements 63 are provided, arranged evenly distributed over a circumference of the packing plate 41. The spring elements 63 may be compression springs. The first hold-down device 27 is not fastened directly on the second carrying device 19, but instead the spring elements 63 are installed between the second carrying device 19 and the first hold-down device 27 and press the first hold-down device 27 continuously onto the second packing 26. Also when there is an upward or downward movement of the second packing 26 in the orientation of FIG. 4, the spring elements 63 remain tensioned and the pressing force PK acts continuously on the second packing 26, whereby the second packing 26 always remains optimally pressed together. For this purpose, the spring elements 63 are pretensioned with a defined force, which is dependent on the mechanical stability of the second packing 26 and the hydrodynamic forces to be expected. The use of spring elements 63 has the advantage that they cover only little cross-sectional area of the vessel 2, and therefore are not determinative for the dimensions of the respective inside diameter $d_3$, $d_4$ of the vessel 2.

Figure 5:
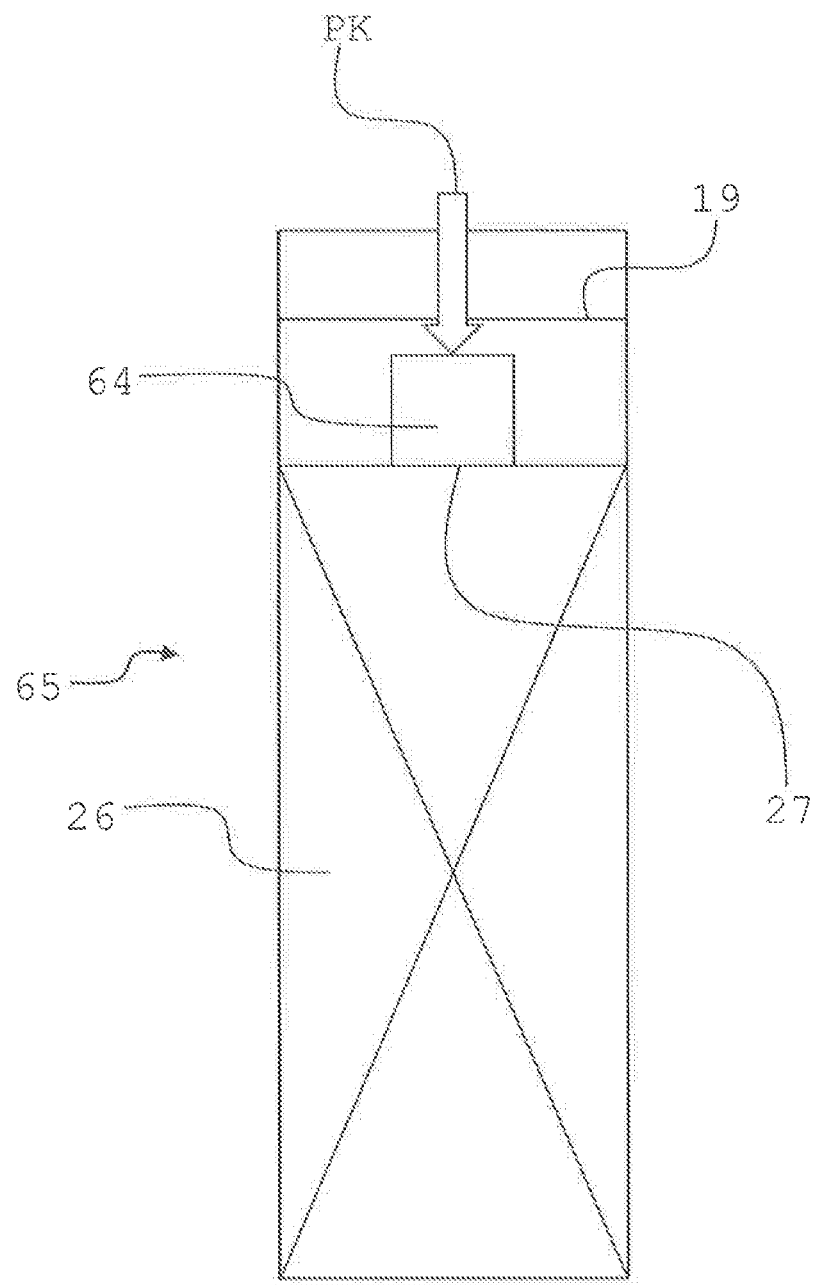
FIG. 5 shows a schematic sectional view of a further embodiment of a packing assembly for the mass transfer column according to FIG. 1.

Alternatively, the pressing force PK may also be applied by a weight instead of with the aid of the spring elements 63. For example, the first hold-down device 27 may be of a particularly heavy construction and rest loosely on the uppermost packing plate 41. Furthermore, the first liquid distributor 29 above the second packing 26 may not be mounted on the third carrying device 20 but instead be placed on the first hold-down device 27. In this way, the weight of the first liquid distributor 29 and of the first hold-down device 27 and the weight of the liquid in the first liquid distributor 29 can be used as the pressing force PK. In order to ensure that the first liquid distributor 27 is horizontally level, which is necessary for an even distribution of the liquid, it is adjusted by means of guides. This allows for example a pressing force of up to 3000 N/m² (30 mbar or about 300 kg/m²) to be achieved. Furthermore, as shown in FIG. 5, additional weights 64 may be placed onto the first hold-down device 27 and/or the first liquid distributor 29. The weights 64 are positioned and fastened in such a way that they do not hinder the gas or liquid flow, or only scarcely. The vessel 2, the second packing 26, the first hold-down device 27, the first liquid distributor 29 and/or the weights 64 can form a packing assembly 65 of the mass transfer column 1.

Figure 6:
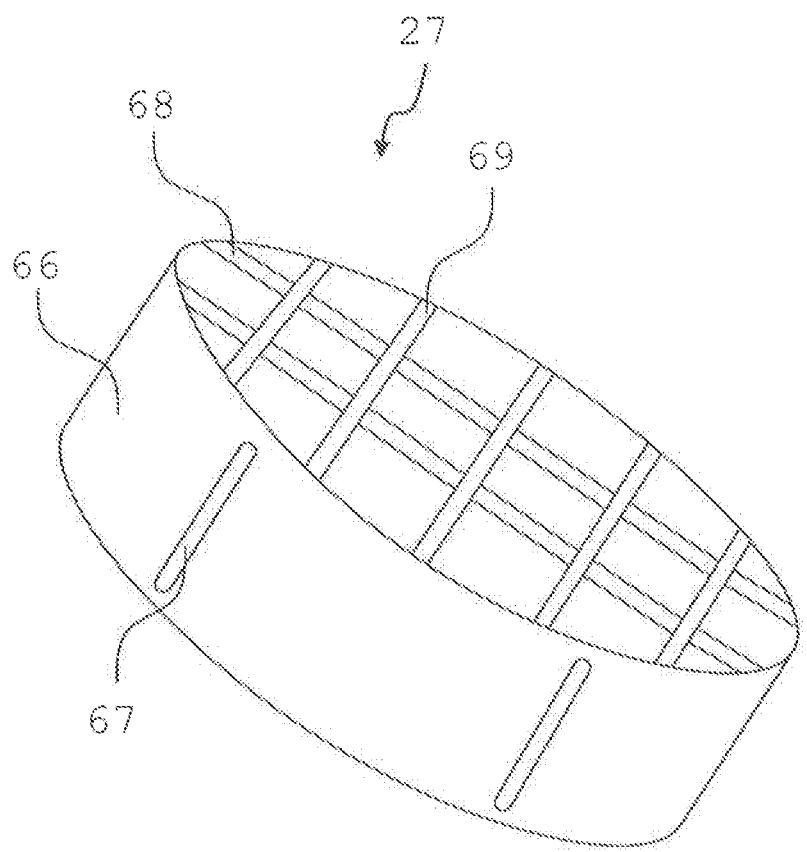
FIG. 6 shows a schematic perspective view of one embodiment of a hold-down device for the mass transfer column according to FIG. 1.

One embodiment of the first hold-down device 27 is shown in FIG. 6. The second hold-down device 33 may be formed in structurally the same way as the first hold-down device 27. The first hold-down device 27 comprises an annular peripheral base portion 66, which is adjustably connected to the second carrying device 19 by the spring elements 63 or by means of slots 67. Furthermore, the first hold-down device 27 comprises crossing transverse struts 68 and longitudinal struts 69, which are arranged in the form of a grid. The first hold-down device 27 may therefore be a grid.

The avoidance of gaps, and similarly the creation of gaps during the operation of the mass transfer column 1 can also be avoided, by the second packing 26 not being installed casually, but particularly carefully, homogeneously and under tension. For this purpose, during installation the prefabricated packing packets 42 to 56 are pressed both against an inner wall of the vessel 2 and against one another and are wedged or lodged by individual packing sheets 57 to 62. A peripheral packing collar or sealing collar 70 (FIG. 2) may also be provided between the vessel 2 and the second packing 26 or each packing plate 36 to 41.

Figure 7:
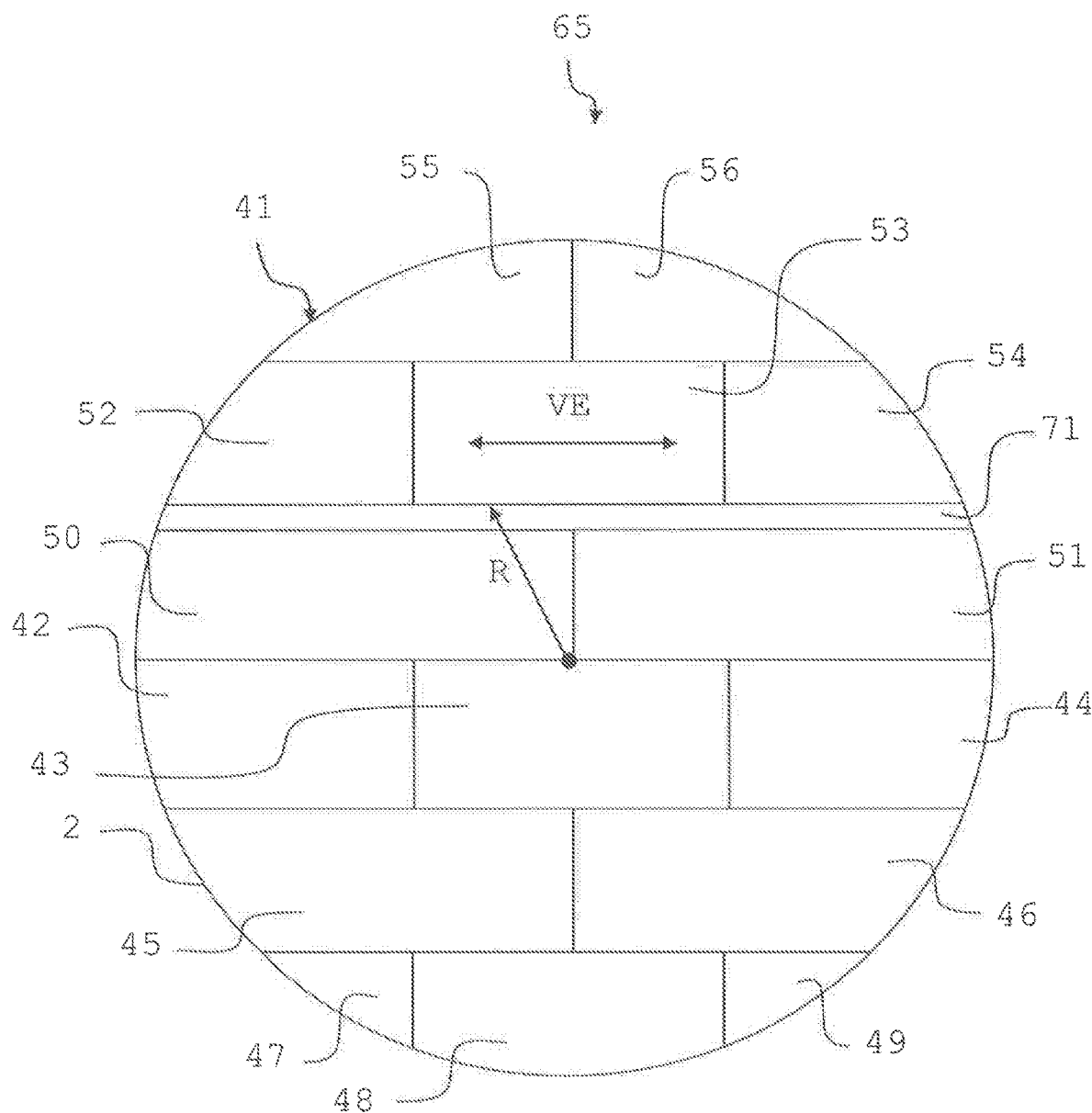
FIG. 7 shows a further schematic view of the packing assembly according to FIG. 2.

For example, as shown in FIG. 7, a gap 71 running parallel to the preferred plane VE may form between the packing packets 52, 53, 54 and the packing packets 50, 51 when fitting the packing plate 41, that is to say when inserting the packing packets 42 to 56 into the vessel 2 and when pressing the packing packets 42 to 56 against one another without any joins. One or more packing sheets 57 to 62 are inserted into the gap 71 in order to brace the packing plates 36 to 41 in the vessel 2. For inserting the packing sheets 57 to 62, smooth, that is to say uncorrugated or unstructured, auxiliary sheets may be used. For this purpose, the auxiliary sheets are inserted into the gap 71 and the packing sheets 57 to 62 are pressed into the gap 71 along the auxiliary sheets. The packing sheets 57 to 62 are installed exclusively while oriented in the direction of the preferred plane VE. All of the packing plates 36 to 41 and all of the packings 25, 26, 32 are fitted in the same way.

Figure 8:
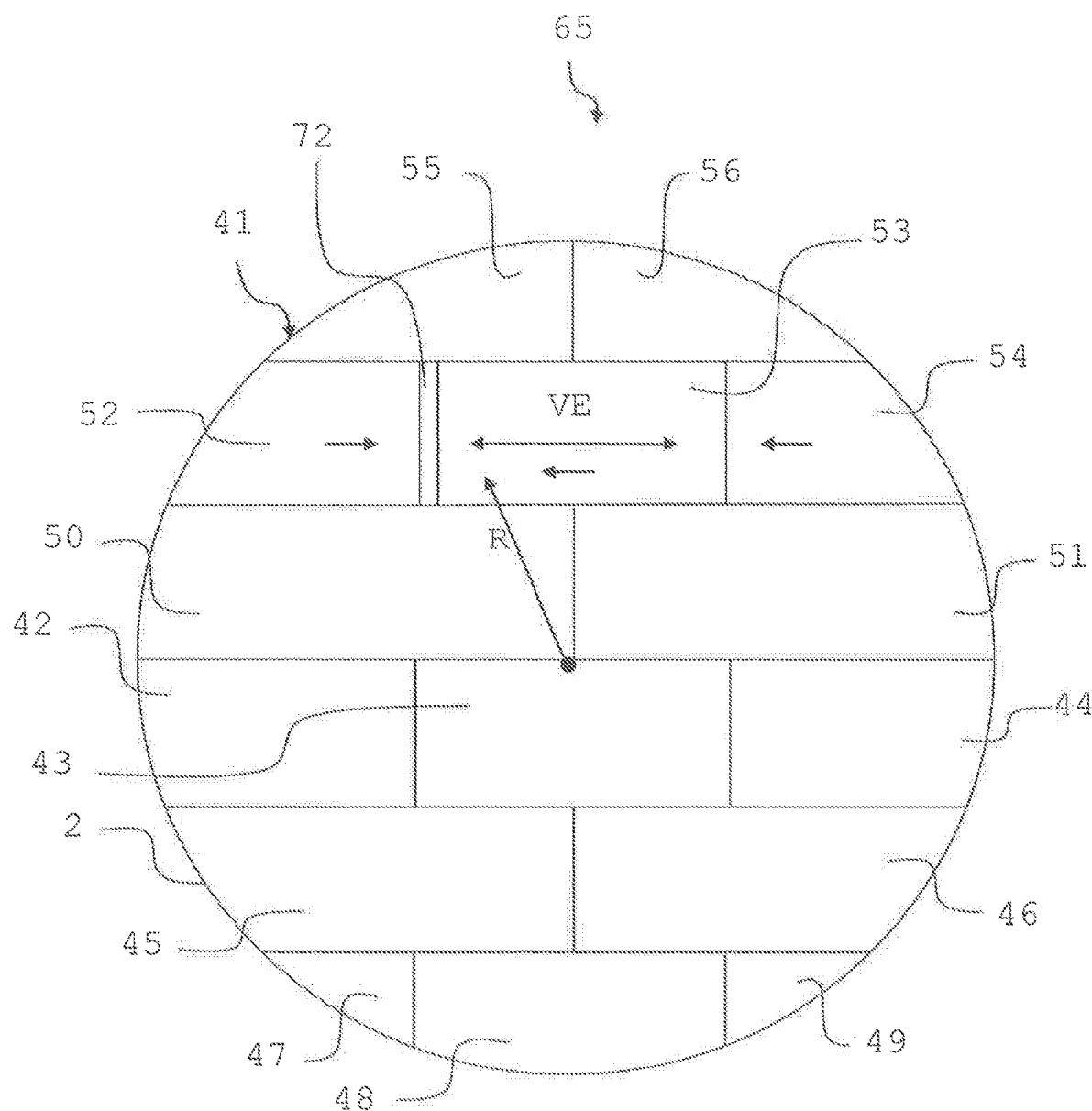
FIG. 8 shows a further schematic view of the packing assembly according to FIG. 2.
Figure 9:
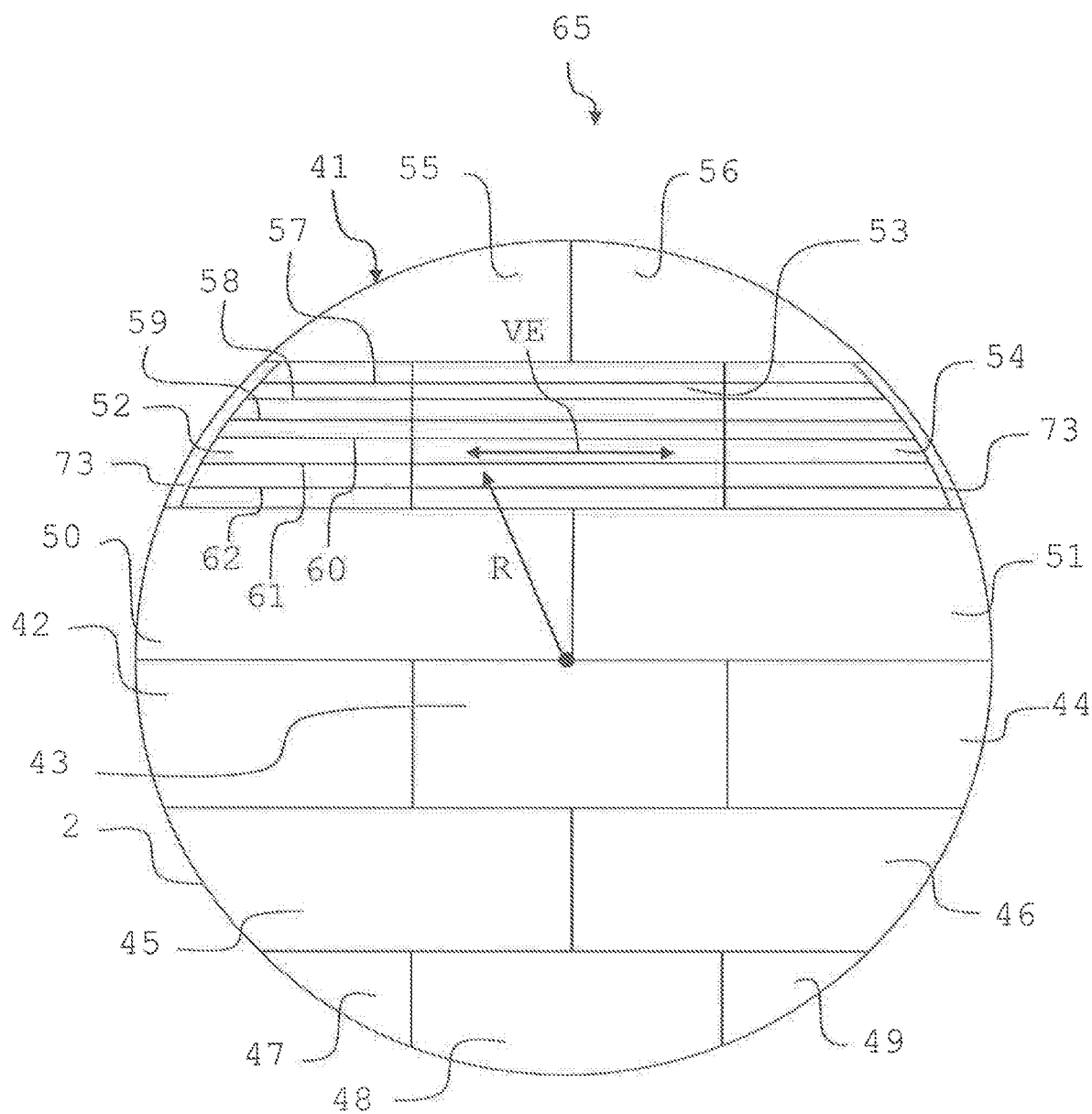
FIG. 9 shows a further schematic view of the packing assembly according to FIG. 2.
Figure 10:
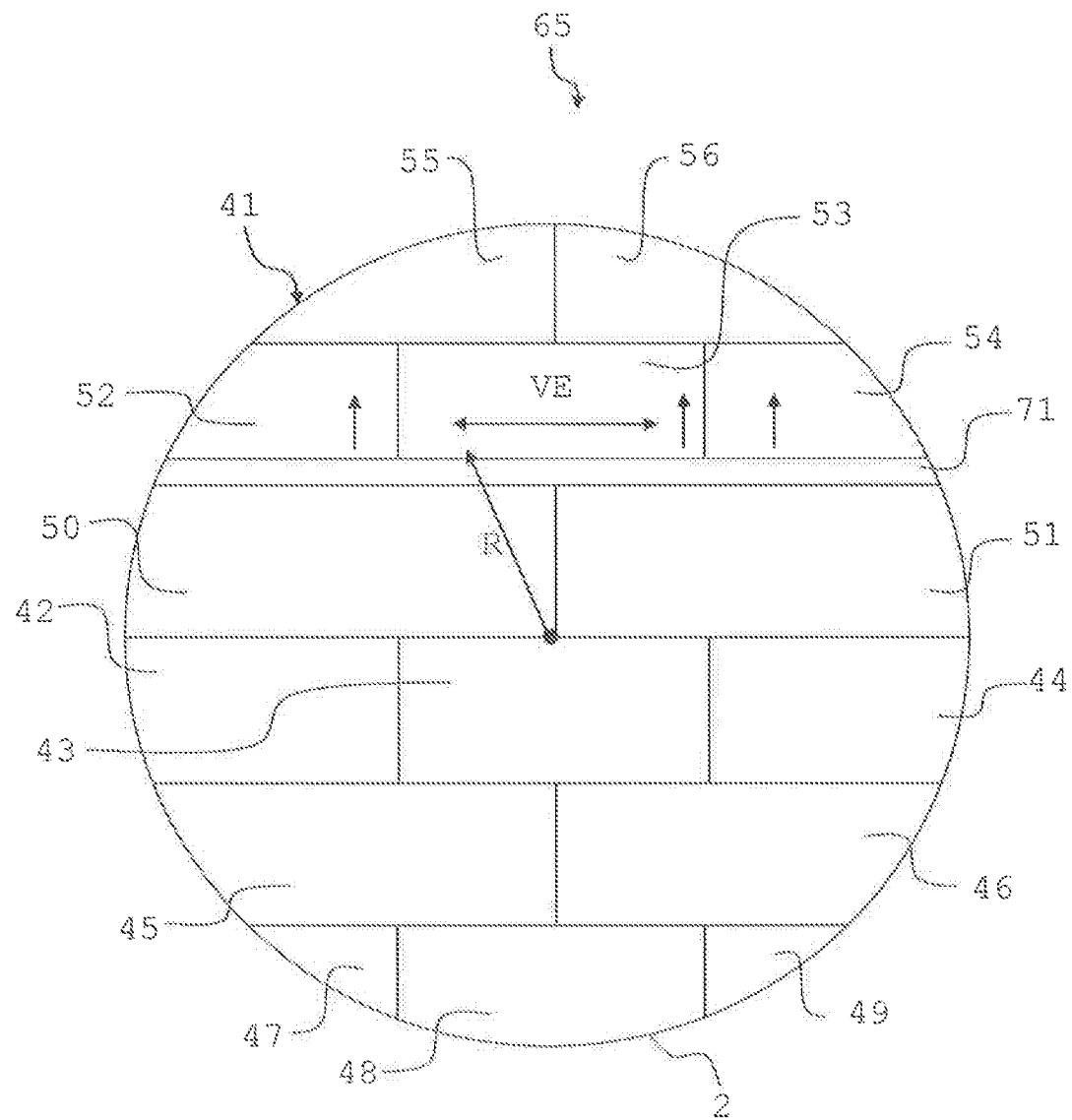
FIG. 10 shows a further schematic view of the packing assembly according to FIG. 2.

As shown in FIG. 8, a gap 72, which is oriented perpendicularly to the preferred plane VE, may also form when fitting the packing packets 43 to 56. For example, the gap 72 may be provided between the packing packets 52 and 53. To close the gap 72, it is not possible to insert packing sheets 57 to 62 into it, since the packing sheets 57 to 62 would then be oriented perpendicularly to the preferred plane VE and would form a barrier in the respective packing plate 36 to 41. Instead, as shown in FIG. 9, the gap 72 is closed by the packing packets 52 to 54 being pressed together in parallel in relation to the preferred plane VE. The pushing together of the packing packets 52 to 54 has the effect of forming circumferential gap(s) 73.

To close the circumferential gap(s) 73, packing sheets 57, 58 of all the packing packets 52 to 54 that are lying on the outside in a radial direction R of the vessel 2 or of the packing plate 41 are removed and the packing packets 52 to 54 are displaced outwardly in the radial direction R until the gaps 73 are closed and the packing packets 52, 54 are in close contact with the vessel 2. Any number of packing sheets 57, 58 may be removed, depending on the size of the gaps 73. By displacing the packing packets 52 to 54 radially outward, a gap 71 running in the preferred plane VE is created again. As explained above, this can be closed with the aid of pushed-in packing sheets 57 to 62. The packing sheets 57, 58 removed from the packing packets 52 to 54 may also be used for closing the gap 71.

Using the packing sheets 57 to 62 for closing the gap 71 allows the tolerances of the vessel 2 and of the packing packets 42 to 56 to be specifically compensated, while making allowance for the sealing collar 70. This produces very homogeneous packing plates 36 to 41, which are in close contact with the inside of the vessel 2 without any clearance and also on which no joints between the packing packets 42 to 56 are present or visible. During the installation of a number of packings 25, 26 lying one on top of the other, it is likewise ensured that the second packing 26 is pressed firmly against the first packing 25 lying thereunder, and all of the gaps 71 to 73 are closed. This special installation procedure means that each packing 25, 26, 32 is constrained in its position, and therefore cannot be displaced even during flooding or gas surges.

Gradual loosening of the packings 25, 26, 32 is prevented by the hold-down devices 27, 33. They are fixedly installed in this setup, because the packings 25, 26, 32 are internally braced, and it is sufficient that this pretensioning is maintained. For this reason, no spring elements or weights are necessary here on the respective hold-down device 27, 33. If a further increase of the tensioning within the packings 25, 26, 32 is desired, they can be compressed by means of weights 64 or by external pressing, for example with the aid of a hydraulic cylinder, before the fitting of the respective hold-down device 27, 33. In the compressed state under pressing, the respective hold-down device 27, 33 is then fixed and the pressing is subsequently removed again.

Figure 11:
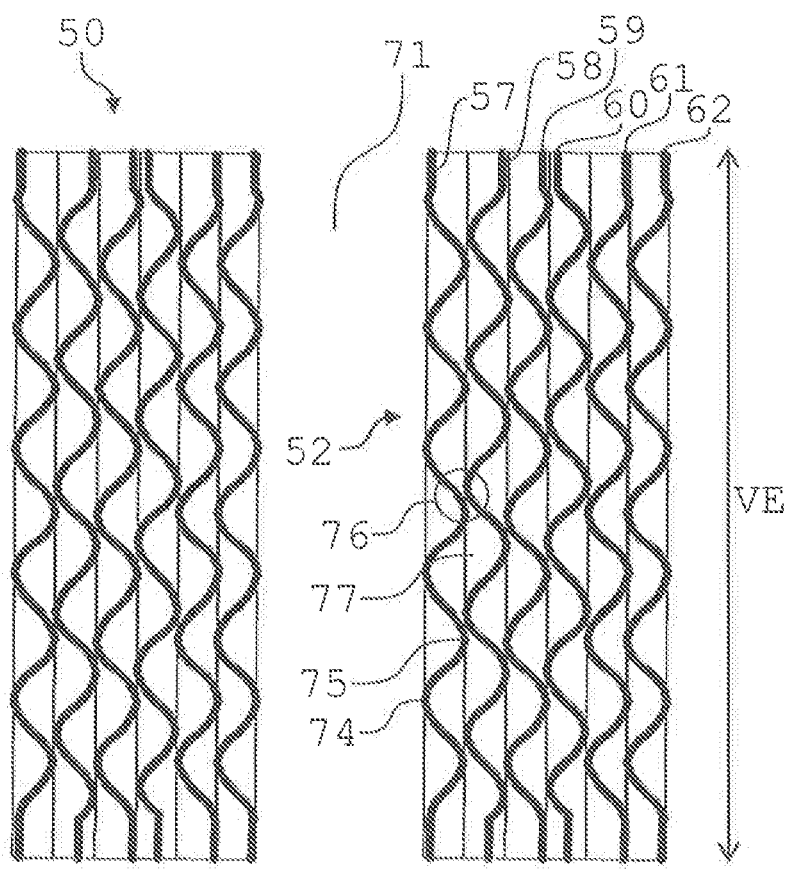
FIG. 11 shows a schematic view of two packing packets for the packing assembly according to FIG. 2.

FIG. 11 shows a schematic view of two packing packets 50, 52 and a gap 71 provided between them. As already explained above, each packing packet 50, 52 is constructed from a number of packing sheets 57 to 62, which are connected to one another. Each packing sheet 57 to 62 is corrugated and has corrugated peaks 74 and corrugated valleys 75 alternating with the corrugation peaks 74. The corrugation peaks 74 of neighboring packing sheets 57, 58 contact one another at contact regions 76.

Defined channels 77, in which gas and/or liquid can flow, are formed between neighboring packing sheets 57, 58. The gap 71 is defined in the present case as a region between packing packets 50, 52 or packing sheets 57 to 62 in which the latter do not contact one another and in which no contact regions 76 are provided. That is to say that, in or at the gap 71, the packing packets 50, 52 or packing sheets 57 to 62 do not touch. Accordingly, it is also the case that none of the aforementioned channels 77 for gas and/or liquid are formed in the gap 71. Such a gap 71 may have a cuboidal geometry.

Figure 12:
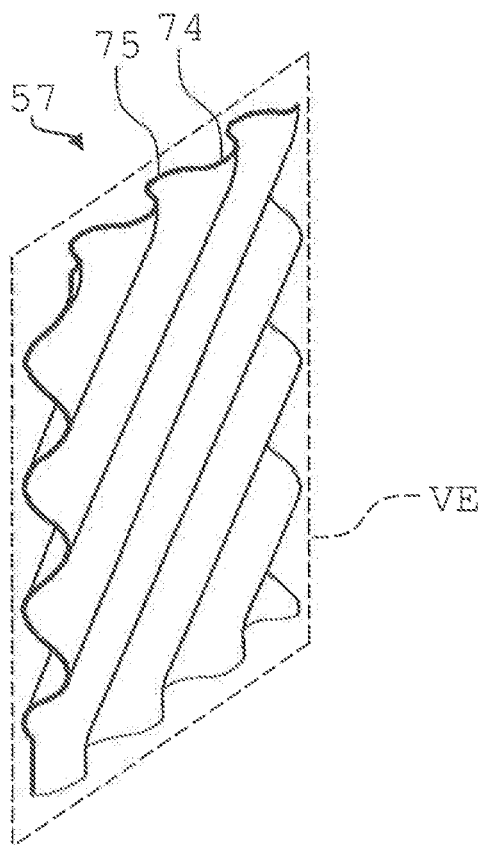
FIG. 12 shows a schematic perspective view of a packing sheet for a packing packet according to FIG. 11.

FIG. 12 shows a schematic perspective view of a packing sheet 57. As can be seen, the corrugation valleys 75 and the corrugation peaks 74 are preferably oriented obliquely in relation to the central axis $M_2$, for example at an angle of 45°.

Figure 13:
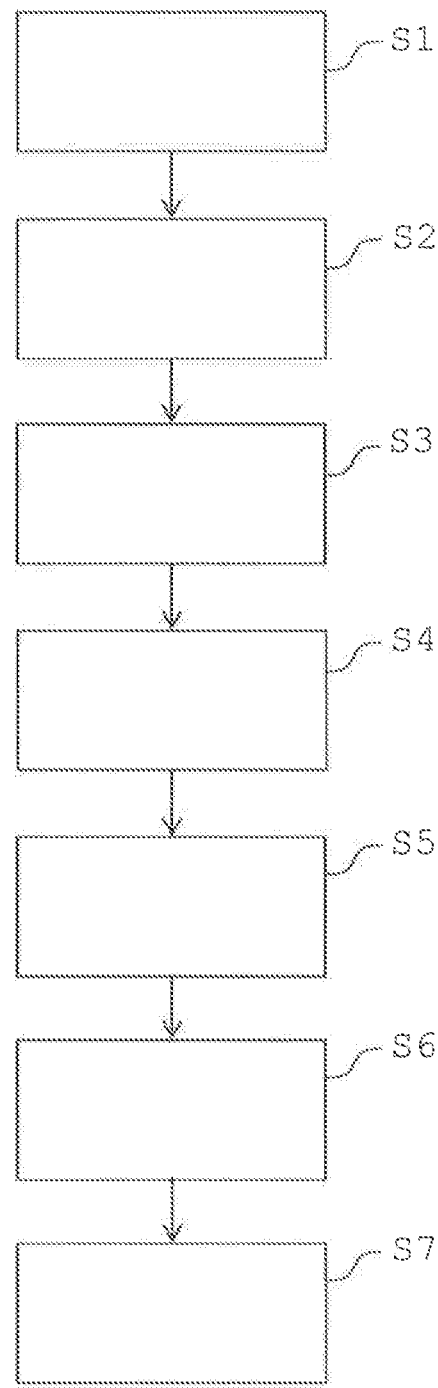
FIG. 13 shows a schematic block diagram of one embodiment of a method for producing the packing assembly according to FIG. 2.

A method shown in FIG. 13 for producing the packing assembly 65 may comprise the following steps by way of example: A step S1 may comprise providing the vessel 2. A step S2 comprises providing packing packets 42 to 56 and a step S3 comprises providing additional packing sheets 57 to 62. In a step S4, the packing packets 42 to 56 are installed in the vessel 2 to form a packing plate 36 to 41. In a step S5, the additional packing sheets 57 to 62 are inserted between the packing packets 42 to 56 in such a way that the at least one packing plate 36 to 41 is pretensioned in the radial direction R of the vessel 2 against the latter. As explained above with reference to FIGS. 7 to 10, the method may also comprise a step S6 of closing gaps 71 oriented in the preferred plane VE and gaps 72 oriented perpendicularly to the preferred plane VE. In a step S7, packing sheets 57 to 62 are thereby inserted exclusively into the gaps 71 that are oriented in or parallel to the preferred plane VE. The gaps 72 that are oriented perpendicularly to the preferred plane VE are closed in particular by a displacement of the packing packets 42 to 56 in the preferred plane VE.

In the method, the additional packing sheets 57 to 62 are always inserted in pairs. It is also possible for a number of pairs of additional packing sheets 57 to 62, for example four additional packing sheets 57 to 62 or six additional packing sheets 57 to 62, to be inserted. That is to say that the number of inserted additional packing sheets 57 to 62 is an even number. The additional packing sheets 57 to 62 are corrugated. The two additional packing sheets 57 to 62 of a pair of additional packing sheets 57 to 62 are in this case arranged in such a way that the corrugation peaks 74 and the corrugation valleys 75 of the packing sheets 57 to 62 cross over and are arranged for example at an angle of 90° to one another. The two additional packing sheets 57 to 62 of a pair of additional packing sheets 57 to 62 then contact one another at the corrugation peaks 74.

Losses of capacity and/or losses of efficiency on account of gaps 71 to 73 within the packings 25, 26, 32 are prevented. As a result, an optimized design of the mass transfer column 1 with lower safety allowances can be carried out. That is to say that the mass transfer column 1 can be designed with a smaller inside diameter $d_3$, $d_4$ for the same performance. Pretensioned packings 25, 26, 32 may furthermore be used in all applications where structured packings are used, for example in vessels for 2- or 3-phase separation, cooling towers or the like.

Although the present invention has been described using exemplary embodiments, it can be modified in various ways.

REFERENCE SIGNS USED

1 Mass transfer column
2 Vessel
3 Vessel portion
4 Vessel portion
5 Vessel portion
6 Cover
7 Base
8 Manhole
9 Manhole
10 Manhole
11 Manhole
12 Manhole
13 Gas outlet
14 Liquid outlet
15 Gas inlet
16 Liquid inlet
17 Liquid inlet
18 Carrying device
19 Carrying device
20 Carrying device
21 Carrying device
22 Carrying device
23 Foundation
24 Supporting grid
25 Packing
26 Packing
27 Hold-down device
28 Fastening element
29 Liquid distributor
30 Pre-distributor
31 Supporting grid
32 Packing
33 Hold-down device
34 Liquid distributor
35 Pre-distributor
36 Packing plate
37 Packing plate
38 Packing plate
39 Packing plate
40 Packing plate
41 Packing plate
42 Packing packet
43 Packing packet
44 Packing packet
45 Packing packet
46 Packing packet
47 Packing packet
48 Packing packet
49 Packing packet
50 Packing packet
51 Packing packet
52 Packing packet
53 Packing packet
54 Packing packet
55 Packing packet
56 Packing packet
57 Packing sheet
58 Packing sheet
59 Packing sheet
60 Packing sheet
61 Packing sheet
62 Packing sheet
63 Spring element
64 Weight
65 Packing assembly
66 Base portion
67 Slot
68 Transverse strut
69 Longitudinal strut
70 Sealing collar
71 Gap
72 Gap
73 Gap
74 Corrugation peak
75 Corrugation valley
76 Contact region
77 Channel
$d_3$ Inside diameter
$d_4$ Inside diameter
$h_2$ Height
$h_{23}$ Height
$h_{25}$ Height
$h_{26}$ Height
$h_{32}$ Height
$L_2$ Longitudinal direction
$M_2$ Central axis
PK Pressing force
R Radial direction
S1 Step
S2 Step
S3 Step
S4 Step
S5 Step
VE Preferred plane

The invention claimed is:

1. A packing assembly for a mass transfer column comprising:
a plurality of structured packing plates and a vessel in which the plurality of structured packing plates are arranged, said vessel having a longitudinal direction along a central axis, and said plurality of structured packing plates forming a structured packing,
wherein each of the plurality of structured packing plates has packing packets, and each packing packet comprises interconnected packing sheets,
wherein the interconnected packing sheets are corrugated and have corrugation peaks and corrugation valleys, wherein neighboring interconnected packing sheets contact one another at the corrugation peaks, wherein additional corrugated packing sheets are inserted between the packing packets in such a way that the plurality of structured packing plates are pretensioned in a radial direction of the vessel against the vessel, wherein the additional corrugated packing sheets are loose packing sheets, wherein in each structured packing plate both the corrugated packing sheets of the packing packets and the additional corrugated packing sheets inserted between the packing packets are arranged exclusively in or parallel to a common plane, wherein the structured packing plates are subjected to a pressing force in a direction opposite to the longitudinal direction of the vessel, wherein the pressing force is applied with the aid of a hold-down device placed onto the structured packing, and wherein (a) the hold-down device is fastened adjustably on a carrying device of the vessel, or (b) the hold-down device is spring-pretensioned with the aid of spring elements in a direction towards the structured packing.

2. The packing assembly as claimed in claim 1, wherein the packing packets are joined to one another.

3. The packing assembly as claimed in claim 1, wherein the additional corrugated packing sheets are inserted between the packing packets in pairs.

4. The packing assembly as claimed in claim 1, wherein the interconnected packing sheets are removable from the packing packets.

5. The packing assembly as claimed in claim 1, wherein the hold-down device is fastened adjustably on a carrying device of the vessel.

6. The packing assembly as claimed in claim 5, wherein slots in which fastening elements are displaceably held for adjusting the hold-down device are provided on the hold-down device.

7. The packing assembly as claimed in claim 1, wherein for applying the pressing force the hold-down device is spring-pretensioned with the aid of spring elements in a direction towards the structured packing.

8. A mass transfer column comprising a packing assembly as claimed in claim 1.

9. A method for producing a packing assembly, comprising:
providing a vessel;
providing packing packets, wherein each packing packet comprises interconnected packing sheets;
providing additional packing sheets;
installing the packing packets in the vessel for forming at least one packing plate; and
closing one or more gaps between packing packets by inserting the additional packing sheets between the packing packets in such a way that the at least one packing plate is pretensioned in a radial direction of the vessel against the latter, wherein both the interconnected packing sheets of the packing packets and the additional packing sheets inserted between the packing packets are arranged exclusively in or parallel to a common plane, wherein, for closing a gap arranged in or parallel to the common plane, the gap is closed by the insertion of the additional packing sheets between the packing packets, and wherein, for closing a gap arranged perpendicularly to the common plane and between two packing packets, the two packing packets are first displaced toward one another parallel to the common plane, packing sheets are removed from the displaced packing packets, and then the displaced packing packets are further displaced in a direction perpendicular to the common plane until the displaced packing packets facing the vessel contact the vessel, in order to form a gap that is arranged parallel to the common plane, wherein the sheets are removed such that, during the step of further displacing the displaced packing packets in a direction perpendicular to the common plane, contact with the vessel of the displaced packing packets facing the vessel is realized without forming a gap between the packing packets that is arranged perpendicular to the common plane, and wherein the gap that is formed and arranged parallel to the common plane is closed by the insertion of the additional packing sheets between the packing packets.

10. The method as claimed in claim 9, wherein a plurality of packing plates are provided, and the plurality of packing plates are pressed together by applying a pressing force.

11. The method as claimed in claim 9, wherein the additional packing sheets are inserted between the packing packets in pairs.

12. The method as claimed in claim 9, wherein the additional packing sheets are removed from the packing packets.

13. The method as claimed in claim 9, wherein said vessel has a longitudinal direction along a central axis, and wherein the at least one packing plate comprises a plurality of packing plates, and wherein the plurality of packing plates are subjected to a pressing force in a direction opposite to the longitudinal direction of the vessel.

14. The method as claimed in claim 13, wherein the pressing force is applied with the aid of: (a) a hold-down device placed onto the plurality of packing plates, (b) a liquid distributor placed onto the plurality of packing plates, and/or (c) a weight placed onto the plurality of packing plates.

15. The method as claimed in claim 14, wherein the hold-down device is fastened adjustably on a carrying device of the vessel.

16. The method as claimed in claim 15, wherein slots in which fastening elements are displaceably held for adjusting the hold-down device are provided on the hold-down device.

17. The method as claimed in claim 14, wherein for applying the pressing force the hold-down device is spring-pretensioned with the aid of spring elements in a direction towards the structured packing.

* * * * *